7/7/87 OR 4,678,888

United States Patent [19]

Camacho et al.

[11] Patent Number: 4,678,888

[45] Date of Patent: Jul. 7, 1987

[54] POWER CIRCUIT APPARATUS FOR STARTING AND OPERATING PLASMA ARC

[75] Inventors: Salvador L. Camacho; David P. Camacho, both of Raleigh, N.C.

[73] Assignee: Plasma Energy Corporation, Raleigh, N.C.

[21] Appl. No.: 789,398

[22] Filed: Oct. 21, 1985

Related U.S. Application Data

[63] Continuation-in-part of Ser. No. 460,062, Jan. 21, 1983, Pat. No. 4,549,065.

[51] Int. Cl.[4] .................... B23K 15/00

[52] U.S. Cl. .................... 219/121 PW; 219/121 PT; 219/130.4

[58] Field of Search .................... 219/121 PW, 121 PT, 219/121 PU, 121 P, 75, 76.16, 121 PM, 121 PR, 130.4, 130.1; 313/231.31, 231.41, 231.51

[56] References Cited

U.S. PATENT DOCUMENTS

| | | | |
|---|---|---|---|
| 3,051,829 | 8/1962 | Manz | 219/75 |
| 3,146,336 | 8/1964 | Whitacre | 219/121 PW |
| 3,558,973 | 11/1968 | Pochert et al. | 219/75 |
| 3,809,850 | 5/1974 | Saenger, Jr. | 219/121 P |
| 3,876,855 | 4/1975 | Hirasawa et al. | 219/74 |
| 4,225,769 | 9/1980 | Wilkins | 219/121 P |
| 4,280,042 | 6/1981 | Berger et al. | 219/121 PW |
| 4,324,971 | 4/1982 | Frappier | 219/121 PW |
| 4,493,969 | 1/1985 | Legrand et al. | 219/75 |
| 4,570,048 | 2/1986 | Poole | 219/121 PR |

*Primary Examiner*—M. H. Paschall

*Attorney, Agent, or Firm*—Bell, Seltzer, Park & Gibson

[57] ABSTRACT

An apparatus for starting and maintaining a plasma arc is disclosed, which comprises a plasma arc torch composed of a rear electrode and a front tubular member, with the tubular member acting as a collimator in transfer arc operation or as an electrode in non-transfer arc operation. The power circuit includes a main DC power supply, an electrical pulse generator in series with the plasma torch, and a protective capacitor connected between the main power supply and pulse generator. To initiate the arc, a high voltage pulse is generated by the pulse generator, which has sufficient power to strike an arc which extends from the rear electrode to an external workpiece in the case of transfer arc operation. The main power supply is used only to maintain the established arc, and thus may have a relatively small voltage capacity.

11 Claims, 4 Drawing Figures

POWER CIRCUIT APPARATUS FOR STARTING AND OPERATING PLASMA ARC

This is a continuation-in-part of copending application Ser. No. 460,062, filed January 21, 1983, now U.S. Pat. No. 4,549,065.

The present invention relates to a plasma arc torch of the type wherein an electric arc is employed to heat a gas to a high temperature, and which is useful for example in the cutting or welding of metals, or the heating of various materials. More particularly, the present invention relates to a power circuit for starting and operating a plasma arc of the described type.

Plasma arc torches are usually designed for operation in one of two modes, which are commonly referred to as the transfer arc mode and the non-transfer arc mode. For the transfer arc mode of operation, the torch typically comprises a tubular rear electrode having a closed inner end, a front tubular member which acts as a collimating nozzle, and a gas vortex chamber for introducing a vortical flow of gas between the rear electrode and front member. The electric arc extends from the rear electrode through the gas vortex chamber and front tubular member, and the arc extends forwardly from the torch and attaches or "transfer" to an external grounded workpiece. The prior U.S. Pat. Nos. 3,194,941 to Baird, and 3,673,375 and 3,818,174 Camacho, illustrate torches of the transfer arc type.

In the case of a plasma arc torch adapted for operation in the non-transfer arc mode, the electric arc extends from the rear electrode through the gas vortex chamber, and it attaches to the front tubular member which then acts as a front electrode. A torch of this general type is illustrated in the patent to Muehlberger, No. 3,740,522.

Plasma arc torches of the described type presently utilize either an AC or a DC power supply. These power supplies necessarily have a large power capacity, and thus high cost, since it is required that the power supply be able to deliver a relatively high voltage, such as 2000 volts or more to the torch to effect the starting of the arc, even though operation of the torch requires a much lower voltage, such as about 500 volts, once the arc is established. In an attempt to reduce the size of the power supply, it has been proposed to add a supplemental starting power supply in parallel with the main power supply. However, these prior supplemental systems have been of relatively low power capacity and they have not proven to be effective in significantly reducing the required size of the main power supply.

It is accordingly an object of the present invention to provide an apparatus for starting a plasma arc, which is adapted to utilize a main power supply having a relatively low voltage capacity, and thus a relatively low cost, and yet which is able to effectively start the operation of the torch.

It is a more specific object of the present invention to provide an apparatus for starting a plasma arc torch by providing a source of high voltage to cause the electrical breakdown of the gas between the electrode of the plasma torch and simultaneously delivering to the breakdown volume enough energy to cause the resistance of the breakdown to be of minimum value that will permit a relatively low voltage power supply to establish the required arc current for maintenance of a stable plasma arc column.

It is a further object of the present invention to provide a torch power supply circuit which is adapted to operate in either the transfer arc mode or the non-transfer arc mode.

These and other objects and advantages of the present invention are achieved in the embodiments illustrated herein by the provision of an apparatus which comprises a plasma torch comprising a rear electrode composed of a tubular metal member having a closed inner end and an open outer end, a front tubular member having a bore therethrough and mounted in coaxial alignment with and separated from the open outer end of the rear electrode, and gas vortex generating means disposed intermediate the rear electrode and the tubular member for generating a vortical flow of gas therebetween. An electrical power supply is also provided, and a circuit operatively interconnects the power supply to the torch, with the circuit including a first line connecting one terminal of the power supply to the rear electrode, and a second line connecting the other terminal of the power supply to the tubular member. An electrial pulse generator is operatively connected to the circuit in series with the plasma torch for selectively applying a direct current pulse of relatively high energy to the gap formed by the rear electrode and tubular member that is sufficient to initiate an arc between the rear electrode and the tubular member. By this arrangement, the energy required for starting the arc is primarily provided by the starting pulse generator. The main power supply is utilized to maintain the arc after the starting pulse generator has established a voltage breakdown of the gap, such breakdown being established with enough energy to reduce the net resistance of the gap and insure the flow of adequate current to maintain the arc column.

In a preferred embodiment, a protective capacitor is disposed in the circuit in parallel with the main power supply for protecting the power supply from the relatively high transient voltage produced by the pulse generator.

Some of the objects and advantages of the present invention having been stated, others will appear as the description proceeds, when taken in conjunction with the accompanying drawings, in which FIG. 1 is a partially schematic sectional view of a plasma arc torch suitable for use with the present invention;

Figure 1:
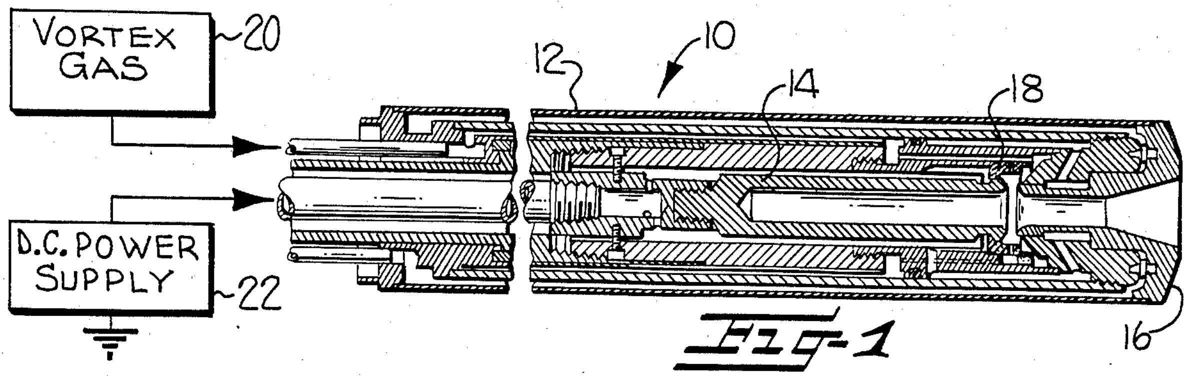

Referring more particularly to the drawings, FIG. 1 illustrates a plasma arc torch 10 adapted for operation in the transfer arc mode, and which is adapted for use with the present invention. The torch includes a tubular housing 12 which mounts a rear electrode 14 composed of a tubular metal member having a closed inner end and an open outer end. Also, a front tubular metal member 16 having a bore therethrough is mounted in coaxial alignment with and separated from the open outer end of the rear electrode, with the tubular member serving as a collimator in transfer arc operation. The torch also includes a gas vortex generating chamber 18 disposed intermediate the rear electrode and the tubular member for generating a vortical flow of gas therebetween. The rear electrode and the front tubular member are preferably formed of copper.

A gas supply system 20 is provided for supplying pressurized gas to the gas vortex chamber 18, and the chamber is designed in a known manner such that a helical or vortical flow of gas is formed between the rear electrode 14 and front tubular member 16 and which then flows forwardly through the front tubular member. The torch is connected to a DC power supply 22, for establishing an electrical potential between the rear electrode 14 and an external workpiece 24 (FIG. 2), so as to establish and maintain an electrical arc extending between the rear electrode and the workpiece, with the gas vortex and tubular member serving to closely collimate the arc. As illustrated, the rear electrode 14 is connected to the anode of the DC power supply, and the workpiece 24 and the cathode of the power supply 22 are grounded to establish the circuit.

Assuming that the torch 10 has a power capacity of about 150 KW, and an operating arc voltage requirement of about 400 to 500 volts, the power supply 22 will preferably have a power capacity only slightly above that requirement, such as about 160 to 200 KW.

Figure 2:
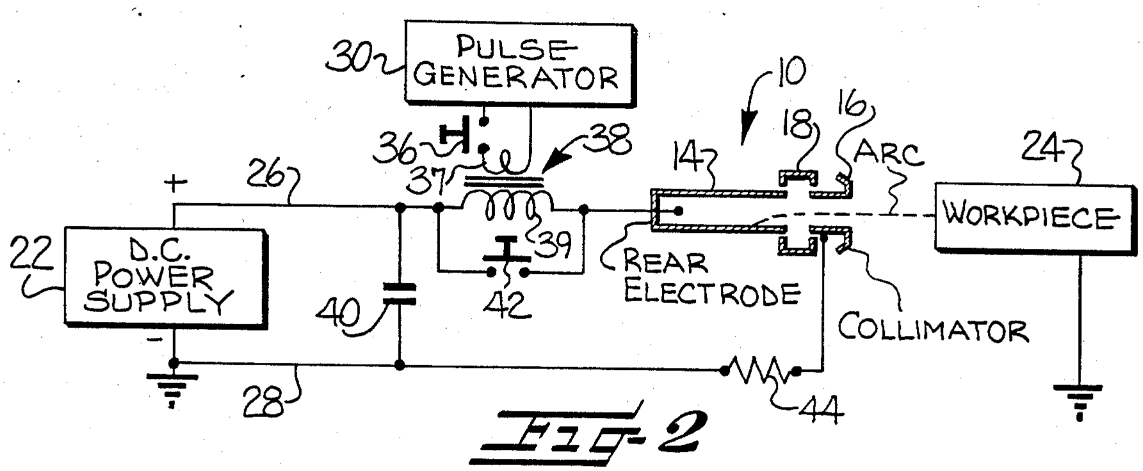
FIG. 2 is a schematic circuit diagram of an apparatus for starting and maintaining a plasma arc utilizing a torch of the type shown in FIG. 1, and which embodies the features of the present invention.

Referring now to FIG. 2, the illustrated embodiment of the power circuit includes a first line 26 connecting the anode of the power supply 22 to the rear electrode 14, and a second line 28 connecting the cathode of the power supply to the tubular member 16. Further, a pulse generator 30 is operatively connected to the first line 26 of the circuit in series with the main power supply 22 and the plasma torch 10 for selectively applying a direct current pulse of relatively high energy to the circuit, and with the energy level of the pulse being sufficient to cause a breakdown of the gap and to establish an arc which extends initially between the rear electrode 14 and the tubular member 18, and then extends from the rear electrode through the tubular member and to the workpiece 24. For a torch of the above described power rating, and for larger torches up to six MW, the pulse generator 30 will preferably have a capacity sufficient to deliver at least about 6 joules during the measurable pulse length (i.e. 1/e of its original value, with e equalling the natural logarithm 2.7/8). Thus the total power delivered during the total duration of each pulse will be between 10 to 15 joules, by reason of the extended decay length of each pulse.

Figure 4:
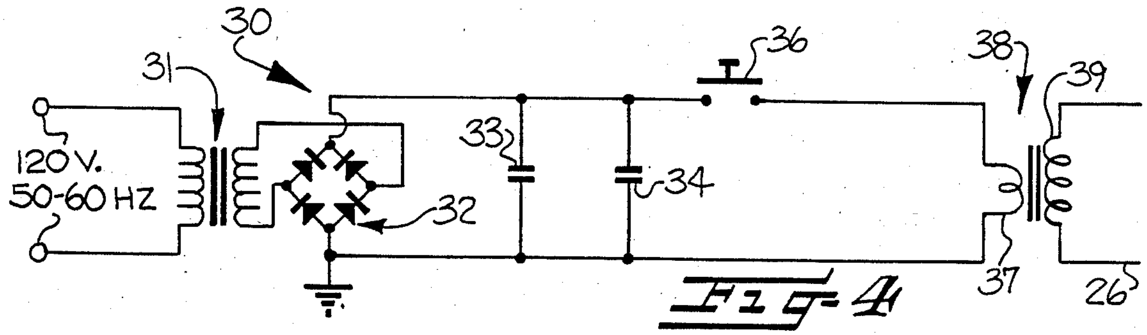
FIG. 4 is a schematic circuit diagram of a pulse generator circuit suitable for use in the circuits of FIGS. 2 and 3.

A pulse generator 30 suitable for use with the present invention is schematically illustrated in FIG. 4, and comprises an external power source, such as 120 VAC single phase 60 Hz, 4 amp source, which is suitable for use with a torch of the above-described power requirements. The alternating current is passed through a transformer 31 and a rectifier 32 so as to charge the two capacitors 33 and 34. A pulse switch 36 connects the circuit to the primary winding 37 of a transformer 38. The secondary winding 39 of the transformer is connected in the first line 26 of the power circuit. In operation, the switch 36 is periodically closed, such as once each second, to provide a voltage pulse of about 2400 volts across the primary winding 37. Assuming that the winding ratio of the transformer 38 is 4 to 66, a voltage of about 39,600 volts is produced across the secondary winding 39, and thus across the gap between the rear electrode 14 and front tubular member 16 of the torch, during each pulse.

The power circuit of the illustrated embodiment of the invention further includes a protective capacitor 40 disposed in the circuit in parallel with the main power supply 22 for protecting the power supply from the relatively high transient voltage produced by the pulse generator 30. A capacitor having a capacity of about 114 microfarads is suitable for a torch of the above described power rating. Also, there is provided a bypass switch 42 for electrically bypassing the secondary winding 39 of the transformer 38, and thus cutting out the pulse generator 30 from the circuit after initiation of the main arc. The rating of the switch 42 is selected so as to be able to carry the current load of the torch. At relatively low currents, such as about 400 amps, the winding 39 itself is able to carry the current, and thus the switch 42 need not be closed. A current limiting resistor 44 is positioned in the secondary line 28 between the tubular member 16 and capacitor 40, which is desirable for offsetting the well known negative current characteristics of a plasma column during start-up.

To further describe the operation of the circuit shown in FIG. 2 during starting, it will be assumed that the bypass switch 42 is open and the switch 36 of the pulse generator is periodically closed to produce a pulsed transient voltage of about 39,600 volts across the gap of the torch, in the manner described above. This voltage of each pulse causes an electrical breakdown of the gap, and then move progressively outwardly through the tubular member 16, until it jumps to the workpiece 24. During the initial portion of this process wherein the arc is attached to the tubular member, the circuit is established through the secondary line 28 and capacitor 40 back to the secondary winding 39 of the transformer 38. Thus the main power supply 22 is effectively isolated and protected from this current by the capacitor circuit 40. Once the arc has jumped to the workpiece, the circuit is completed through ground, and as the voltage of the pulse generator dissipates, the main power supply 22 becomes effective to maintain the arc at its operating voltage of 400 to 500 volts in the described example. The switch 42 is then closed, to bypass the secondary coil 39 of the transformer 38, in the case of relatively high current operation.

Figure 3:
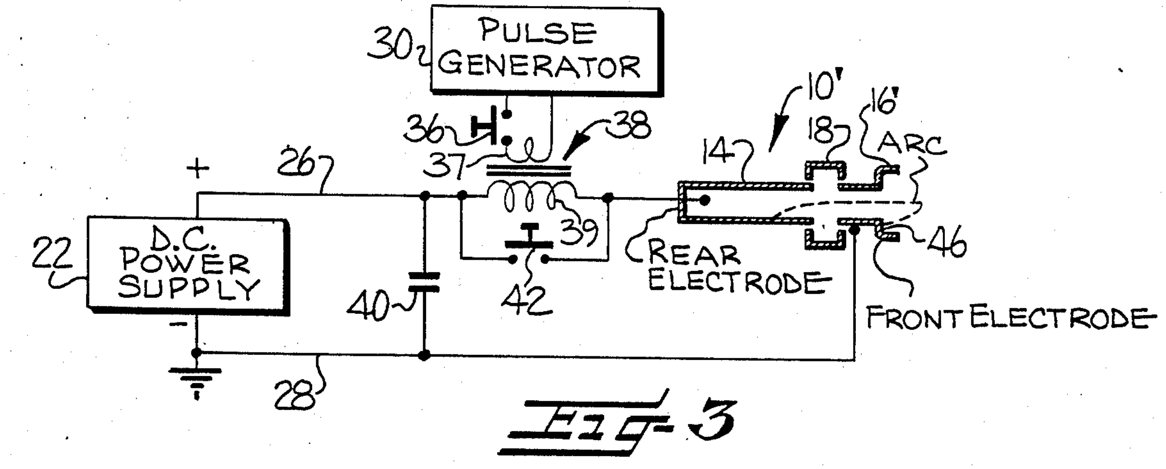
FIG. 3 is a schematic circuit diagram of an apparatus similar to that shown in FIG. 2, but illustrating the circuit in association with a non-transfer arc torch.

FIG. 3 illustrates a similar power circuit, except that the torch 10' is designed for operation in the non-transfer mode. In this embodiment, the front tubular member serves as a front electrode 16', and has a bore which includes an outer end portion which is cup-shaped in cross section to define an outwardly facing radial shoulder 46. Also, the power supply 22 and the gas vortex generating system 18, 20 are adapted to be coordinated, such that the arc attaches on the radial shoulder 46 of the front electrode 16'. As a result, the attachment of the arc results in erosion of the electrode material along an axial path of travel, rather than radially through the electrode, to thereby extend the life of the front electrode. A front electrode of this type is further described in copending application Ser. No. 670,399, filed Nov. 9, 1984, as well as parent application Ser. No. 460,062.

In the event the main power supply comprises an alternating current, the pulse generating circuit would preferably be designed to superimpose a direct current pulse during a half cycle of the alternating current. More particularly, the pulse would have a measurable duration which is shorter than the half cycle of the alternating current. The main power supply would then take over the maintenance of current flow after voltage breakdown of the gap is initiated by the pulse.

In the drawings and specification, there has been set forth a preferred embodiment of the invention, and although specific terms are employed, they are used in a generic and descriptive sense only and not for purposes of limitation.

That which is claimed is:

1. An apparatus for starting and maintaining a plasma arc which is characterized by the use of a power supply of relatively low capacity and cost, and comprising a plasma torch comprising a rear electrode composed of a tubular metal member having a closed inner end and an open outer end, a front tubular metal member having a bore therethrough and mounted in coaxial alignment with and separated from said open outer end of said rear electrode, and gas vortex generating means diposed intermediate said rear electrode and said front tubular member for generating a vortical flow of a gas therebetween, an electrical power supply, circuit means operatively interconnecting said power supply to said plasma torch and including a first line connecting one terminal of said power supply to said rear electrode, and a second line connecting the other terminal of said power supply to said front tubular member, and electrical pulse generator means operatively connected to said circuit means in series with said plasma torch for selectively applying direct current pulses of relatively high energy to said circuit means and which is sufficient to initiate an electrial arc between said rear electrode and said front tubular member, said pulse generator means including a secondary transformer coil connected in said circuit means, and bypass switch means for selectively removing said secondary transformer coil from said circuit means.

2. The apparatus as defined in claim 1 further comprising protective capacitor means disposed in said circuit means in parallel with said power supply for protecting said power supply from the relatively high transient voltage produced by said pulse generator means.

3. The apparatus as defined in claim 2 wherein said secondary transformed coil is connected in said first line, and a resistor is positioned in said second line between said front tubular member and said capacitor means.

4. An apparatus for starting and maintaining a plasma arc which is characterized by the use of a power supply of relatively low capacity and cost, and comprising a plasma torch comprising a rear electrode composed of a tubular metal member having a closed inner end and an open outer end, a front tubular metal member having a bore therethrough and mounted in coaxial alignment with and separated from said open outer end of said rear electrode, and gas vortex generating means disposed intermediate said rear electrode and said front tubular member for generating a vortical flow of a gas therebetween, a direct current power supply, circuit means operatively interconnecting said power supply to said plasma torch and including a first line connecting one terminal of said power supply to said rear electrode, and a second line connecting the other terminal of said power supply to said front tubular member, electrical pulse generator means operatively connected to said circuit means for selectively applying direct current pulses of relatively high energy to said circuit means and which is sufficient to intiate an electrial arc between said rear electrode and said front tubular member, said pulse generator means comprising a source of direct current pulses, and transformer means connecting said source to said first line in series with said plasma torch, bypass switch means for selectively removing said transformer means from said circuit means, and protective capacitor means disposed in said circuit means in parallel with said power supply for protecting said power supply from the relatively high transient voltage produced by said pulse generator means.

5. The apparatus as defined in claim 4 wherein said transformer means is connected between said capacitor means and said torch.

6. The apparatus as defined in claim 4 wherein said second line of said circuit means includes a resistor positioned between said front tubular member and said capacitor means.

7. The apparatus as defined in claim 4 wherein said first line of said circuit means is connected to the anode of said power supply, and said second line of said circuit means is connected to the cathode of said power supply.

8. The apparatus as defined in claim 4 wherein said rear electrode and said front tubular member are copper.

9. The apparatus as defined in claim 4 wherein said apparatus further comprises a grounded workpiece positioned closely adjacent said front tubular member, and wherein said second line of said circuit means is also connected to ground, and wherein said pulse generator means has a power capacity sufficient to initiate an arc which extends from said rear electrode through said tubular member and to said workpiece, and with said power supply having sufficient power capacity to maintain said arc upon the pulse generator means being disconnected from said circuit means by said bypass switch means for operation in the transfer arc mode.

10. The apparatus as defined in claim 4 wherein said bore of said front tubular member includes an outer portion which is cup-shaped in cross section to define an outwardly facing radial shoulder, and said apparatus further comprises means for coordinating said vortex generating means and said power supply such that the arc is adapted to attach on said radial shoulder for operation in the non-transfer arc mode.

11. The apparatus as defined in claim 4 wherein said electrical pulse generator means has a power capacity sufficient to deliver at least about six joules to said torch during the measurable pulse length of each pulse.

* * * * *